United States Patent
Suzuki

(10) Patent No.: US 6,222,287 B1
(45) Date of Patent: Apr. 24, 2001

(54) MOTOR

(75) Inventor: Ryuji Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,066

(22) Filed: Nov. 3, 1999

(30) Foreign Application Priority Data

Nov. 6, 1998 (JP) .................................. 10-331941
Dec. 8, 1998 (JP) .................................. 10-366108

(51) Int. Cl.[7] .................................. H02K 37/00
(52) U.S. Cl. .................. 310/49 R; 310/254; 310/99
(58) Field of Search .................. 310/49 R, 194, 310/162, 42, 254, 96, 99, 91; 29/596–598

(56) References Cited

U.S. PATENT DOCUMENTS 3,646,375 * 2/1972 Mader ..................... 310/83
5,982,058 * 11/1999 Bustamante et al. ............ 310/49 R
6,031,305 * 2/2000 Satoh et al. ................. 310/49 R

FOREIGN PATENT DOCUMENTS 3-207254    9/1991  (JP) .

* cited by examiner

Primary Examiner—Tran Nguyen
(74) Attorney, Agent, or Firm—Fitzpatrick, Cella, Harper & Scinto

(57) ABSTRACT

A motor includes a first stator yoke which is excitable by energization into a first coil, a second stator yoke which is excitable by energization into a second coil, and a rotor which can be driven for rotation under the control of energization into the first coil and the second coil, wherein the first stator yoke and the second stator yoke are disposed in the rotational axial direction of the rotor, while the rotor is provided with a rotational output portion which can take out the rotational output with a gap between the first stator yoke and the second stator yoke. By this arrangement, a novel motor can be configured to take out the rotational output without problems of noise generation in the motor transmission drive, fully coping with the mounting conditions on the products.

14 Claims, 16 Drawing Sheets

US 6,222,287 B1

MOTOR

BACKGROUND OF THE INVENTION

1. Field of the Invention

The present invention relates to a motor which takes out the rotational output from the central portion of a motor main body, and in particular to a motor that is preferably configured to the stop driving of an electromagnetic driving stop device.

2. Related Background Art

Conventionally, an electromagnetic driving motor was typically composed of a stator yoke, a coil, a rotor and others in a unit as one block, a rotor shaft protruding from its electromagnetic driving motor, wherein the output was transmitted by providing a rotational output member, for example, a gear, on the rotor shaft protruding therefrom, and using the rotation of its gear.

On the other hand, an electromagnetic driving motor having a stator yoke disposed radially to the rotational axis direction is well known in a stepping motor constituted by the electromagnetic driving motor, as described in Japanese Patent Application Laid-Open No. 3-207254.

In the conventional examples, however, in the former case, the rotor shaft protruding from an electromagnetic driving motor block is inboard within the electromagnetic driving motor, but a portion protruding from the electromagnetic driving motor block is in so-called cantilevered form. If a rotational force is transmitted to a working member having a load in this state, a radial force is applied on the gear of the rotor shaft, due to a reaction against that load, that is, a side pressure is applied on the rotor shaft, to flex the rotor shaft at its free end portion in cantilevered form. On the other hand, the rotor shaft has a force applied to restore the flexed state to counteract the load of the working member. That is, if the rotor shaft is rotated, the rotor shaft itself turns, whirling.

But there is a problem that, because an oscillation is transmitted to the gear as a transmission mechanism on the side of the working member, giving rise to a chatter sound or chatter oscillation and giving against the trend in recent years for silent motors, thereby producing, manufactured products degraded in quality. Also, this led to another problem that side pressure is applied on the rotor shaft, which causes a concentrated stress to be applied on the bearing, resulting in poor motor performance. On the other hand, there was a problem with products having an electromagnetic driving motor mounted so that when the rotor shaft can not be protruded from the aspect of the space, they can not cope with the current constitution of compact products.

Also, in the latter case (Japanese Patent Application Laid-Open No. 3-207254), when there was an obstacle in a radial space direction of the rotor (when there was another part in this radial space portion in mounting on the product), the use of an electromagnetic driving motor having a pencil-like rotor shaft protruding therefrom was obliged to cope with this, resulting in the previously described problem.

SUMMARY OF THE INVENTION

In the light of the above-mentioned problems, it is an object of the present invention to provide a motor which can take out the rotational output from a central portion of a motor main body while preventing oscillation and noise to produce the stable output.

It is another object of the invention to provide a motor which is preferably constituted for the stop driving of an electromagnetic driving stop device.

Other objects of the present invention will be clear from the following specific embodiments.

DETAILED DESCRIPTION OF THE PREFERRED EMBODIMENTS

The preferred embodiments of the present invention will be described below with reference to the drawings. First, a motor according to the present invention is typically shown in FIG. 1.

Figure 1:
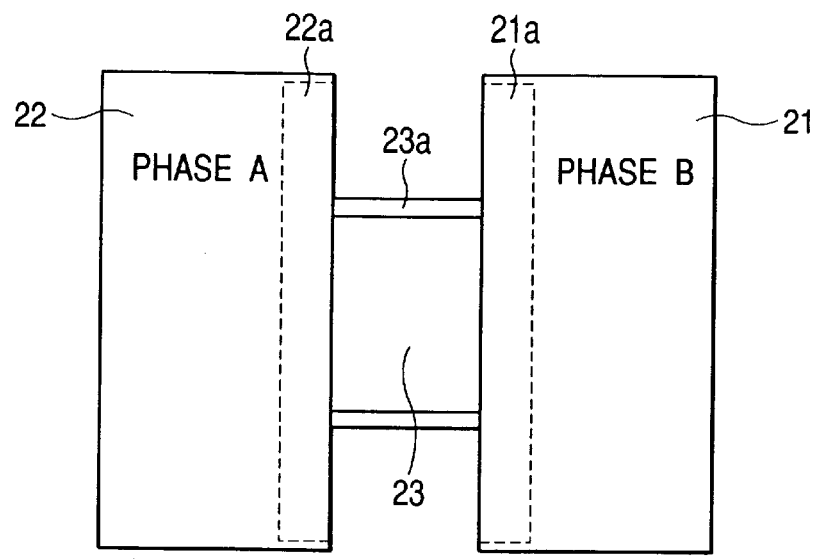
FIG. 1 is a view typically showing a motor according to the present invention.

FIG. 1 shows the overall constitution of a two-phase stepping motor according to the present invention. In FIG. 1, 21 is phase A of motor including a first rotor 21a, a first stator yoke, a first coil, and 22 is phase B of motor including a second rotor 22a, a second stator yoke, and a second coil. 23 is a rotational shaft coupling the first rotor 21a of the phase A 21 and the second rotor 22a of the phase B 22. This rotational shaft 23 is formed with a rotation output portion for taking out the rotational output of motor as a gear 23a.

Also, the rotational shaft 23 formed with the gear 23a has its diameter smaller than that of the first rotor 21a and the second rotor 22a. By this arrangement, it is possible to obtain a greater reduction ratio of gear output from the rotational shaft 23. Because the diameter of the first rotor 21a and the second rotor 22a is greater than that of the rotational shaft 23 formed with the gear 23a, the magnetic flux of each rotor consisting of the permanent magnets can be increased to have a greater motor torque.

In this way, because the diameter of the rotational shaft 23 formed with the gear 23a is smaller than that of the first rotor 21a and the second rotor 22a, an interspace is formed between the first rotor 21a and the second rotor 22a, the gear output of the rotational shaft 23 being taken out from this interspace.

Further, the gear output of this rotational shaft 23 is taken out from the central part of the entire motor so that a stable output with less vibration can be obtained.

A first embodiment which embodies the motor of the invention as shown in FIG. 1 will be described below with reference to FIGS. 2 to 8.

Figure 3:
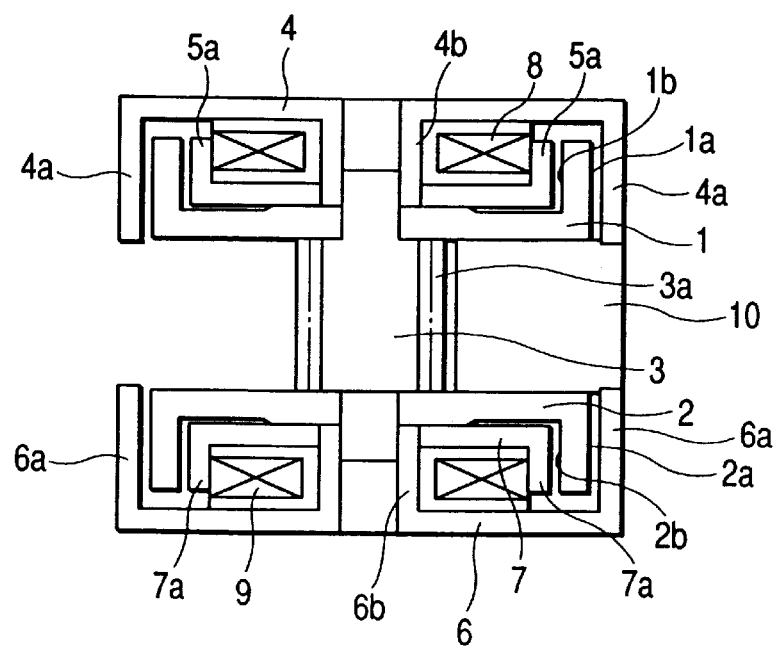
FIG. 3 is a cross-sectional view of the motor as shown in FIG. 2, when assembled.
Figure 2:
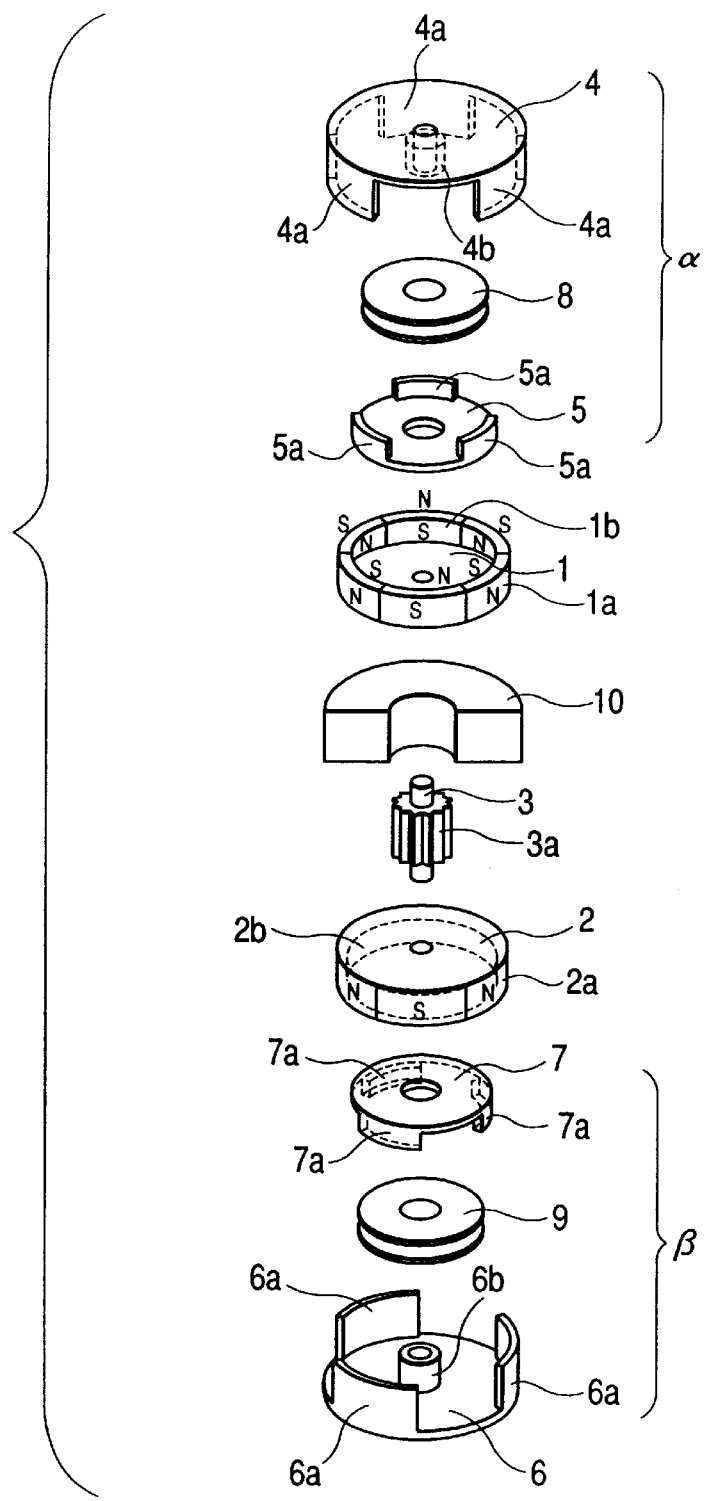
FIG. 2 is an exploded perspective view of a motor in a first embodiment in which the motor as shown in FIG. 1 is embodied.

FIG. 2 is an exploded perspective view of the motor as shown in FIG. 1 which is embodied, and FIG. 3 is a cross-sectional view of the motor as shown in FIG. 2, when assembled.

In FIG. 2, 1 is a first rotor which has been magnetized to produce plural magnetic regions from an outer diameter portion 1a to an inner diameter portion 1b (or from the inner diameter portion 1b to the outer diameter portion 1a), that is, magnetized so that the outer diameter portion 1a and the inner diameter portion 1b are different poles. 2 is a second rotor which has been magnetized to produce the same number of magnetic regions as the first rotor from an outer diameter portion 2a to an inner diameter portion 2b (or from the inner diameter portion 2b to the outer diameter portion 2a), that is, magnetized so that the outer diameter portion 2a and the inner diameter portion 2b are different poles, like the first rotor.

3 is a rotational shaft having an output gear 3a for transmitting the rotational output as an electromagnetic driving motor to the outside, securing the first rotor 1 and the second rotor 2 to the end face of gear so that they have the same phase (of the magnetic pole) with respect to the rotational direction.

4 is a first stator yoke shoe having a plurality of projection-like comb teeth 4a. 5 is another first stator yoke shoe formed by a soft magnetic substance having a plurality of projection-like comb teeth 5a. Also, the projection-like comb teeth 5a are formed in the same number as the comb teeth 4a of the first stator yoke shoe 4 and in the same phase as the rotational direction of the first rotor 1, the comb teeth 4a, 5a being configured to be apart by 360° in electrical angle relative to the magnetization of the first rotor 1.

It is noted that the first stator yoke shoes 4, 5 are configured as a first stator yoke α so that the magnetic path can be closed when an inner cylindrical portion 4b of the first stator yoke shoe 4 comes into direct contact with the first stator yoke shoe 5.

6 is a second stator yoke shoe formed by a soft magnetic substance, like the first stator yoke shoe 4, having a plurality of projection-like comb teeth 6a. 7 is another second stator a yoke shoe formed by soft magnetic substance having a plurality of projection-like comb teeth 7a. Also, the projection-like comb teeth 7a are formed in the same number as the comb teeth 6a of the second stator yoke shoe 6 and in the same phase relative to the rotational direction of the second rotor 2, the comb teeth 6a, 7a being constituted to be apart by 360° in electrical angle with respect to the magnetization of the second rotor 2.

It is noted that the second stator yoke shoes 6, 7 are configured as a second stator yoke β so that the magnetic path can be closed when an inner cylindrical portion 6b of the second stator yoke shoe 6 comes into direct contact with the second stator yoke shoe 7, and can become another stator yoke (with respect to the first stator yoke α) of a two-phase type stepping motor.

Also, the projection-like comb teeth 6a, 7a of the second stator yoke β have a phase of rotational direction which is apart by 90° in electrical angle with respect to the projection-like comb teeth 4a, 5a of the first stator yoke α.

Further, the rotor shaft 3 is rotatably fitted by the inner cylindrical portion 4b of the first stator yoke shoe 4 and the inner cylindrical portion 6b of the second stator yoke shoe 6, the output gear 3a being disposed in a gap between the first stator yoke α and the second stator yoke β to take out the output from the rotational shaft 3, and to complete a cage motor (i.e., a motor which can take out the output from the center of thrust relative to the rotational axial direction.)

8, 9 are coils for exciting the first stator yoke a and the second stator yoke β, respectively, and wound concentrically with respect to the rotational direction of the first rotor 1 and the second rotor 2. 10 is a motor case for unifying the electromagnetic driving motor by positioning and supporting the first stator yoke α and the second stator yoke β with the constitution as previously described.

The operation of this electromagnetic driving motor (stepping motor) will be described below with reference to FIGS. 4 to 8. FIGS. 4 to 8 are plane views as seen from the above (a view showing the relations of the first stator yoke α) in the upper figures, cross-sectional views in the intermediate figures, and plane views as seen from the bottom (a view showing the relations of the second stator yoke β) in the lower figures. Note that the driving method of the stepping motor will be described below with regard to a one-two phase driving method.

Figure 4:
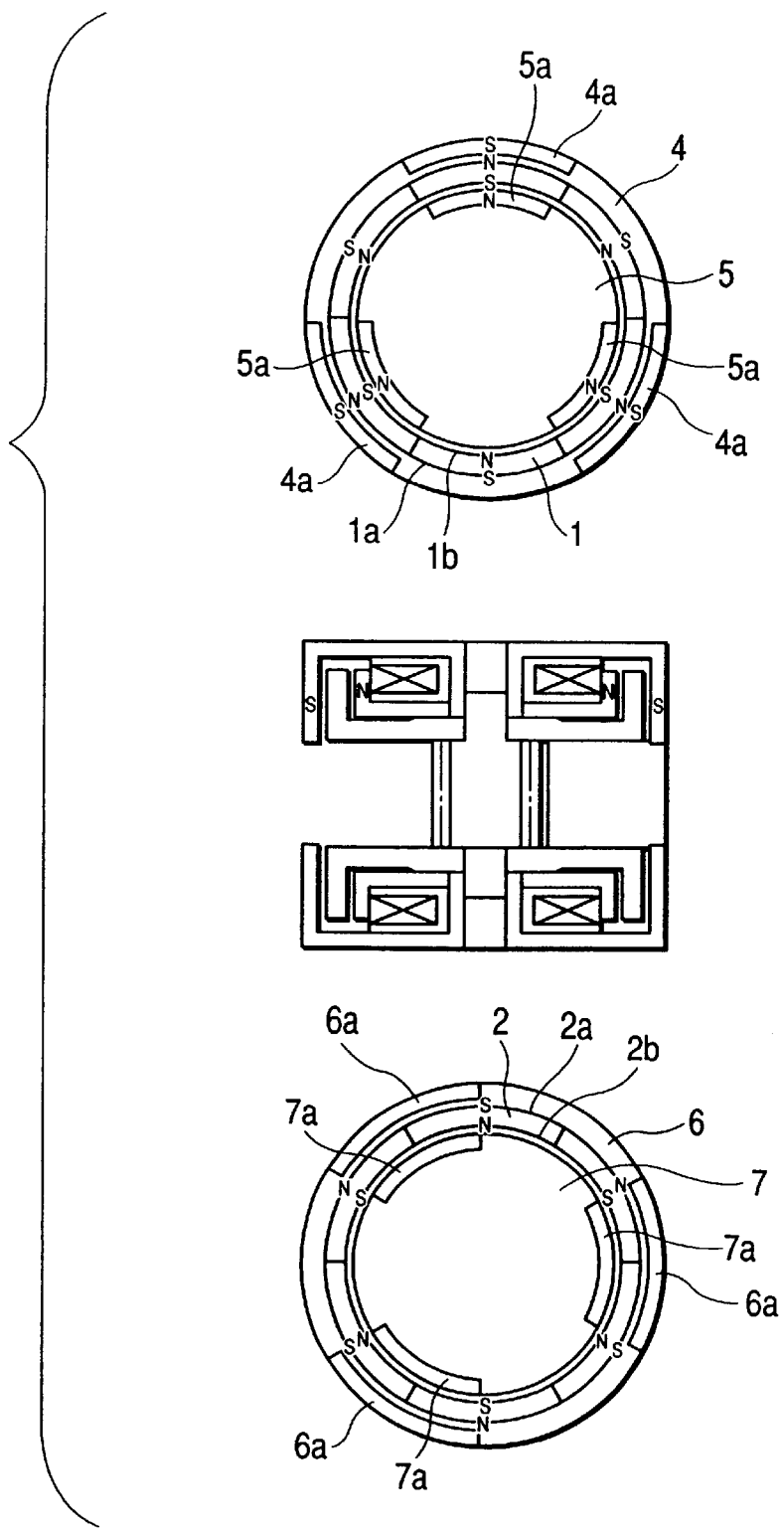
FIG. 4 is a view showing the first state for explaining the rotational operation of the motor as shown in FIG. 3.

First, the initial state is shown in FIG. 4. In this state, the first stator yoke α is excited so that the comb teeth 4a are an S-pole and the comb teeth 5a an are N-pole by energizing the coil 8, to coincide the angular center of magnetization in the first rotor 1 with that of the comb teeth 4a, 5a. On the other hand, since the coil 9 is not energized, the second stator yoke β is not excited, so that the angular center of magnetization for the second rotor 2 is disposed apart by 90° in electrical angle with respect to the angular center of the comb teeth 6a, 7a. From this state, the coil 9 is energized to excite the second stator yoke β, so that the comb teeth 6a are an N-pole and the comb teeth 7a are an S-pole, for example, whereby the second rotor 2 is subject to attraction and repulsion by each magnetic pole, forcing the rotor itself (including the first rotor 1, the second rotor 2 and the rotational shaft 3) to be rotated in a counterclockwise direction in the state of the lower figure (in a clockwise direction in the above figure.)

Figure 5:
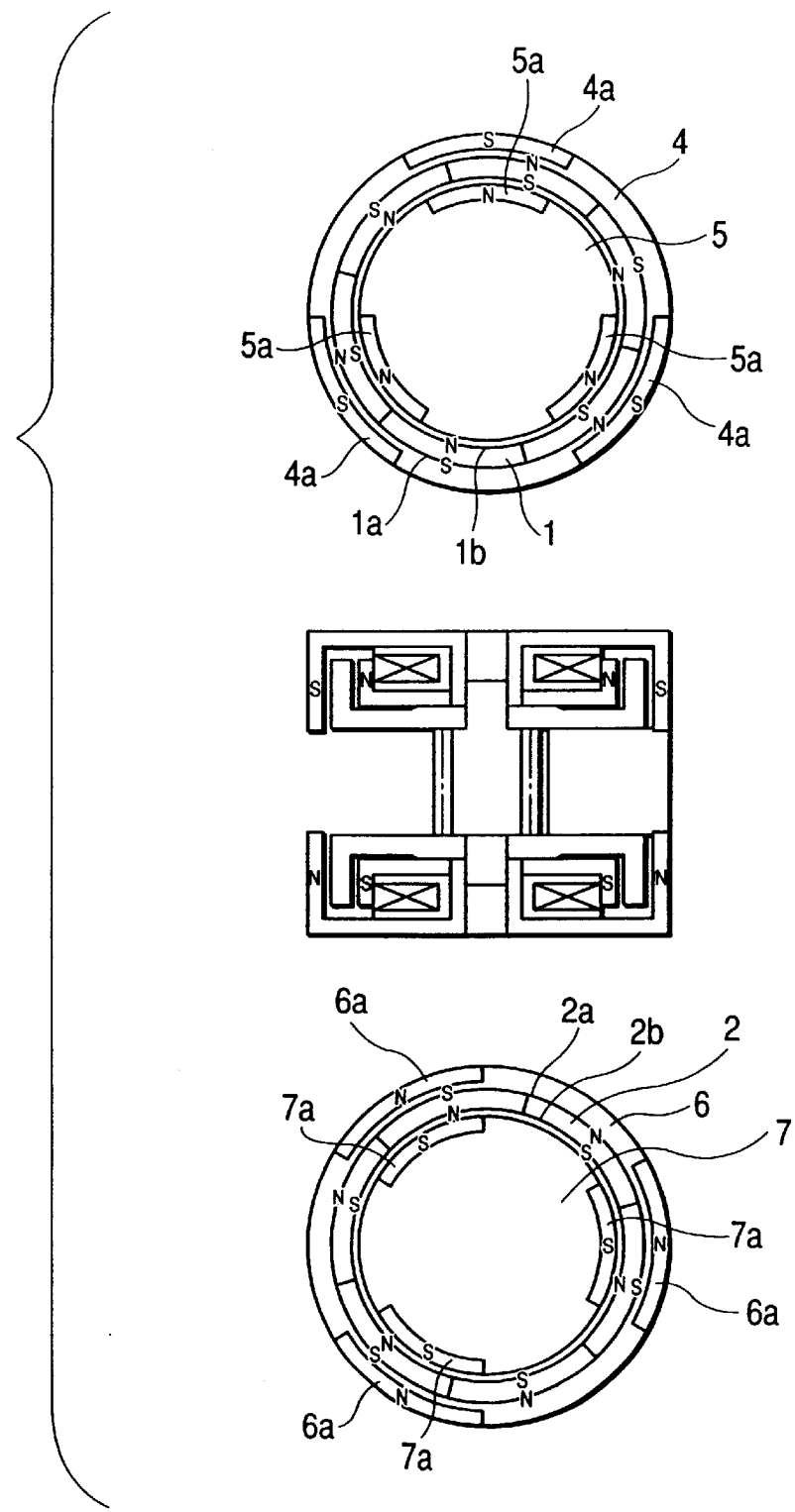
FIG. 5 is a view showing the second state for explaining the rotational operation of the motor as shown in FIG. 3.

On the other hand, since the first stator yoke α continues the excited state, the rotor (including the first rotor 1, the second rotor 2, and the rotor gear 3) is rotated by 45° in electrical angle in the clockwise direction in the state of the upper figure and then stands still (state of FIG. 5).

Figure 6:
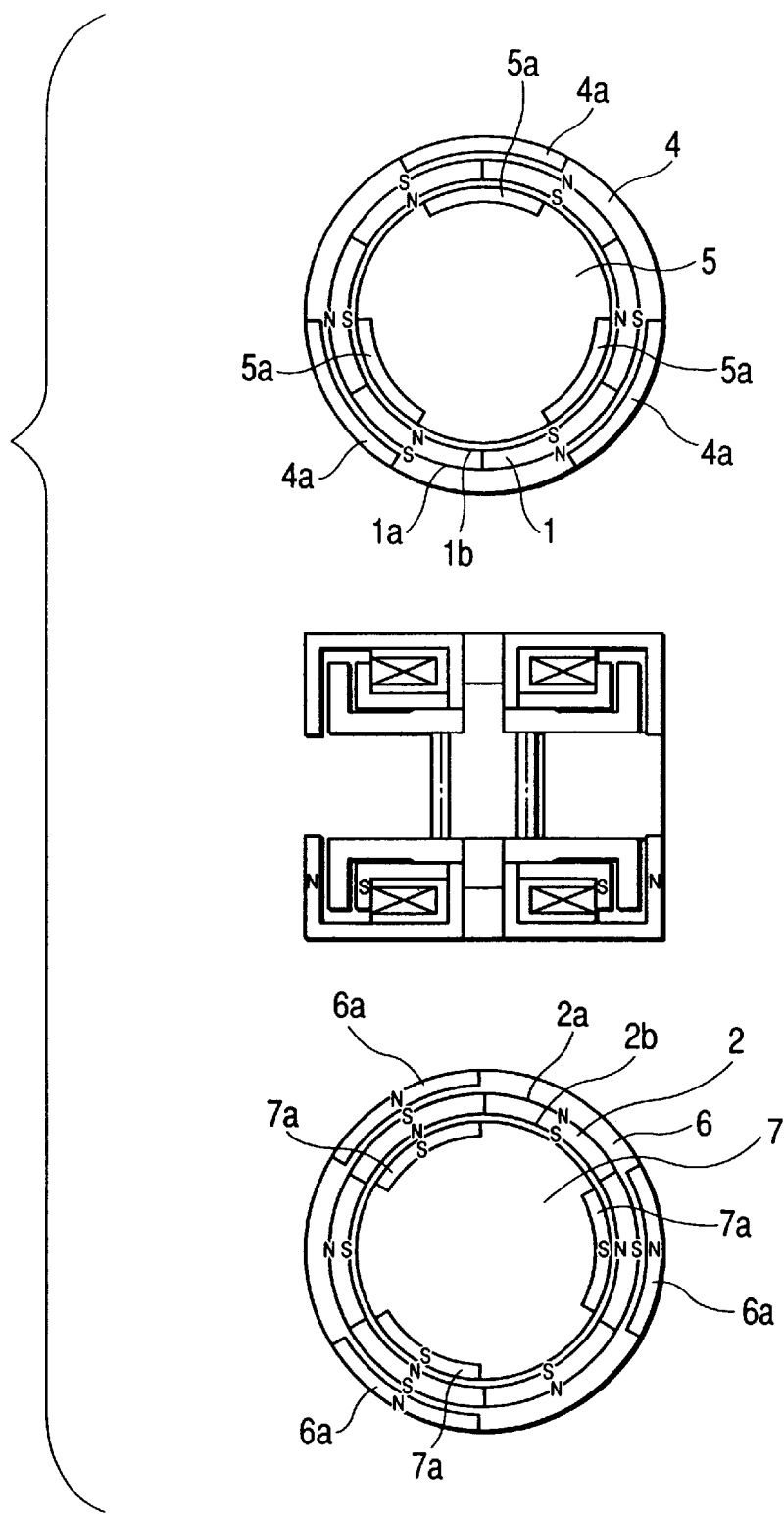
FIG. 6 is a view showing the third state for explaining the rotational operation of the motor as shown in FIG. 3.
Figure 7:
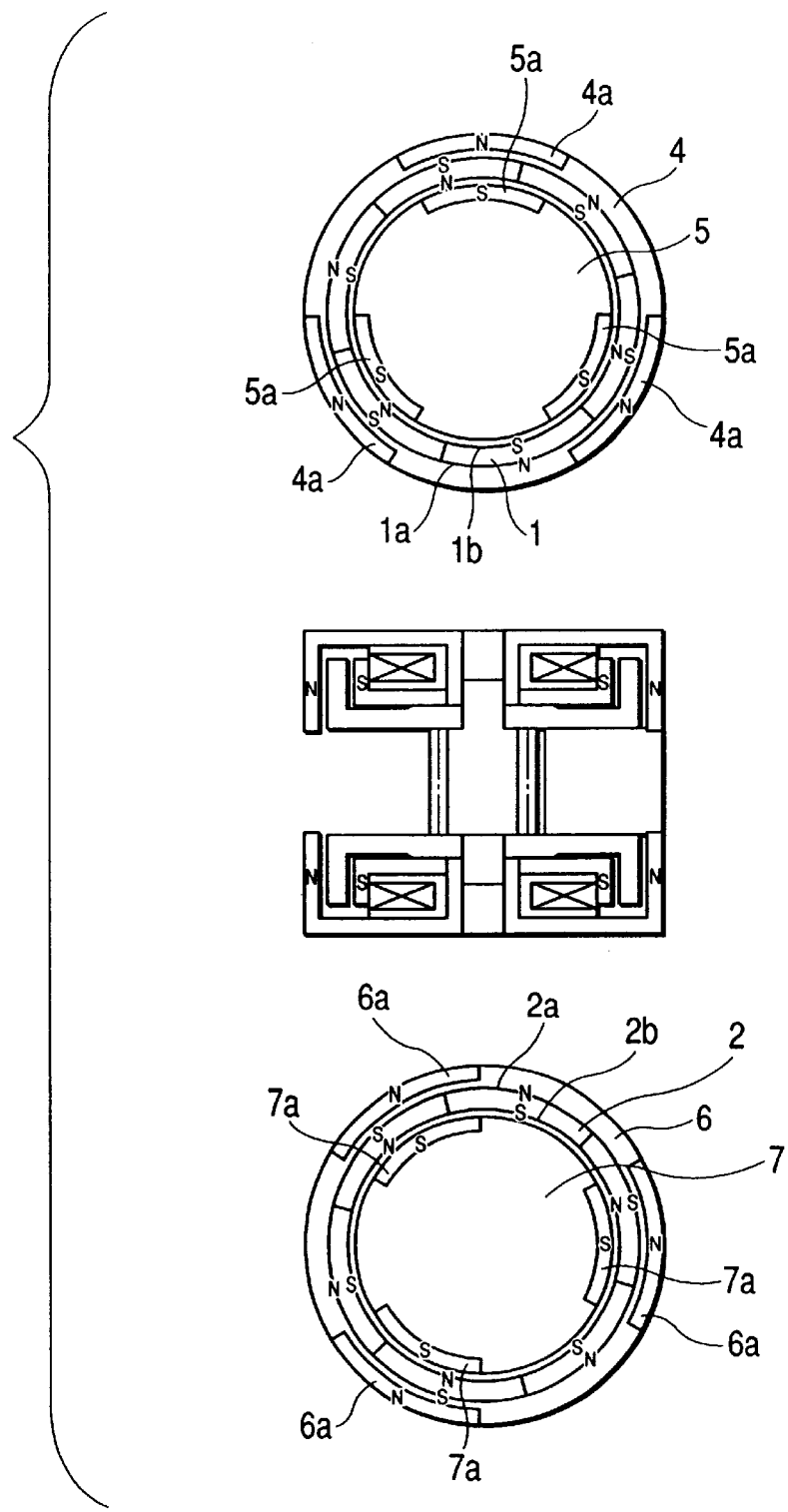
FIG. 7 is a view showing the fourth state for explaining the rotational operation of the motor as shown in FIG. 3.

If the excitation of the first stator yoke α is released, the second rotor 2 is further rotated in the counterclockwise direction by 45° in electrical angle in the state of the lower figure (in the clockwise direction in the above figure) so as to coincide the central part of magnetization angle for the second rotor 2 with the angular center of the comb teeth 4a, 5a, with the magnetic force of the second rotor 2 and the excitation of the second stator yoke β, and stands still (state of FIG. 6).

Then, the coil 8 is reenergized, but is excited so that the comb teeth 4a of the first stator yoke α may be an N-pole and the comb teeth 5a may be an S-pole at this time. Thereby, the first rotor 1 is subject to attraction and repulsion by each magnetic pole, with the magnetic force of the first rotor 1 and the excitation of the first stator yoke α, so that the rotor itself (including the first rotor 1, the second rotor 2 and the rotational shaft 3) is further rotated in the clockwise direction in the state of the upper figure (in the counterclockwise direction in the under figure). On the other hand, since the second stator yoke β continues the excited state, the rotor (including the first rotor 1, the second rotor 2, and the rotor gear 3) is rotated by 45° in electrical angle in the counterclockwise direction in the state of the lower figure and stands still (state of FIG. 7).

Figure 8:
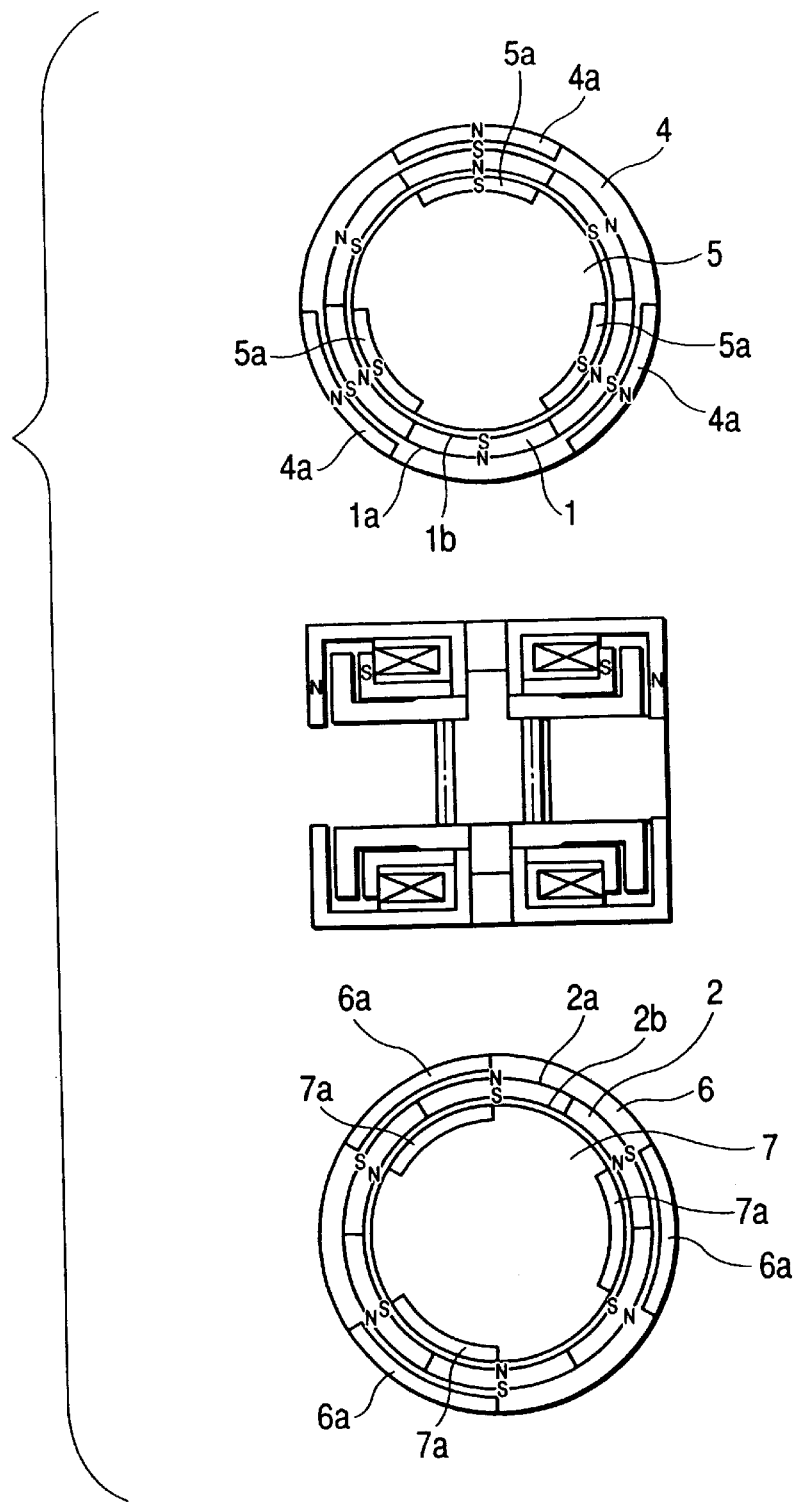
FIG. 8 is a view showing the fifth state for explaining the rotational operation of the motor as shown in FIG. 3.

Then, if the excitation of the second stator yoke β is released, the first rotor is further rotated in the clockwise direction by 45° in electrical angle in the state of the above figure so as to coincide the angular center of magnetizing portion for the first rotor 1 with the angular center of the comb teeth 4a, 5a, with the magnetic force of the first rotor 1 and the excitation of the first stator yoke α, and stands still (state of FIG. 8). By continuing this relation, the motor can be rotated. Note that the excitation relation may be reversed in order to rotate the motor in an opposite direction to the rotational direction as previously described.

A second embodiment, which embodies a motor of the invention as show in FIG. 1, will be described below with reference to FIGS. 9 to 14, in which a different point from the first embodiment is that the angular phase of the rotor and stator is changed.

Figure 9:
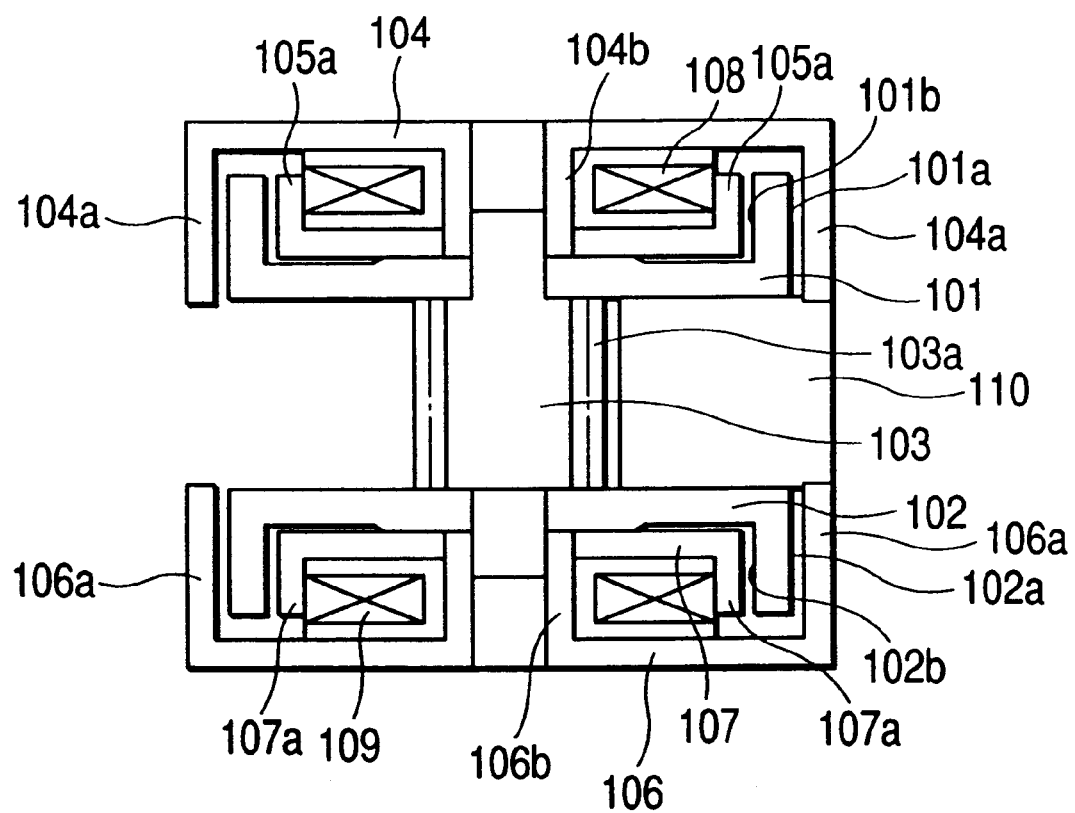
FIG. 9 is a cross-sectional view of a motor in a second embodiment in which the motor as shown in FIG. 1 is embodied.

FIG. 9 is a cross-sectional view of the motor as shown in FIG. 1 and embodied, when assembled.

In FIG. 9, 101 is a first rotor that has been magnetized to produce plural magnetic regions from an outer diameter portion 101a to an inner diameter portion 101b (or from the inner diameter portion 101b to the outer diameter portion 110a), that is, magnetized so that the outer diameter portion 101a and the inner diameter portion 101b are different poles. 102 is a second rotor which has been magnetized to produce the same number of magnetic regions as the first rotor 101 from an outer diameter portion 102a to an inner diameter portion 102b (or from the inner diameter portion 102b to the outer diameter portion 102a), that is, magnetized so that the outer diameter portion 102a and the inner diameter portion 102b are different poles, like the first rotor 101.

103 is a rotational shaft having an output gear 103a for transmitting the rotational output as an electromagnetic driving motor to the outside, which secures the first rotor 101 and the second rotor 102 to the end face of gear so that their magnetic poles are apart by 90° in electrical angle with respect to the rotational direction.

104 is a first stator yoke shoe formed by a soft magnetic substance and having a plurality of projection-like comb teeth 104a. 105 is another first stator yoke shoe formed by a soft magnetic substance and having a plurality of projection-like comb teeth 105a. Also, the projection-like comb teeth 105a are formed in the same number as the comb teeth 104a of the first stator yoke shoe 104 and in the same phase as the rotational direction of the first rotor 101, the comb teeth 104a, 105a being configured to be apart by 360° in electrical angle relative to the magnetization of the first rotor 101. It is noted that the first stator yoke shoes 104, 105 are configured as a first stator yoke α so that the magnetic path can be closed when the inner cylindrical portion 104b of the first stator yoke shoe 104 comes into direct contact with the first stator yoke shoe 105.

106 is a second stator yoke shoe formed by a soft magnetic substance, like the first stator yoke shoe 104, having a plurality of projection-like comb teeth 106a. 107 is another second stator yoke shoe formed by a soft magnetic substance having a plurality of projection-like comb teeth 107a. Also, the projection-like comb teeth 107a are formed in the same number as the comb teeth 106a of the second stator yoke shoe 106 and in the same phase relative to the rotational direction of the second rotor 102, the comb teeth 106a, 107a being constituted to be apart by 360° in electrical angle with respect to the magnetization of the second rotor 102. It is noted that the second stator yoke shoes 106, 107 are configured as a second stator yoke β so that the magnetic path can be closed when an inner cylindrical portion 106b of the second stator yoke shoe 106 comes into direct contact with the second stator yoke shoe 107, and can become another stator yoke (with respect to first stator yoke α) of a two-phase type stepping motor.

Also, the projection-like comb teeth 106a, 107a of the second stator yoke β have the phase of rotational direction disposed apart by 0° (same phase) in electrical angle with respect to the projection-like comb teeth 104a, 105a of the first stator yoke α. Further, the rotor gear 103 is rotatably fitted by the inner cylindrical portion 104b of the first stator yoke shoe 104 and the inner cylindrical portion 106b of the second stator yoke shoe 106, the output gear 103a being disposed in a gap between the first stator yoke α and the second stator yoke β to take out the output from the rotational shaft 103, and to complete a cage motor (i.e., a motor which can take out the output from the center of thrust relative to the rotational axial direction.)

108, 109 are coils for exciting the first stator yoke α and the second stator yoke β, respectively, and are wound concentrically with respect to the rotational direction of the first rotor 101 and the second rotor 102. 110 is a motor case for unifying the electromagnetic driving motor by positioning and supporting the first stator yoke α and the second stator yoke β with the constitution as previously described.

The operation of this electromagnetic driving motor will be described below with reference to FIGS. 10 to 14. FIGS. 10 to 14 are plane views as seen from the above (a view showing the relations of the first stator yoke α) in the upper figures, cross-sectional views in the intermediate figures, and plane views as seen from the bottom (a view showing the relations of the second stator yoke β) in the lower figures. Note that the driving method of the stepping motor will be described below with regard to a one-two phase driving method.

Figure 10:
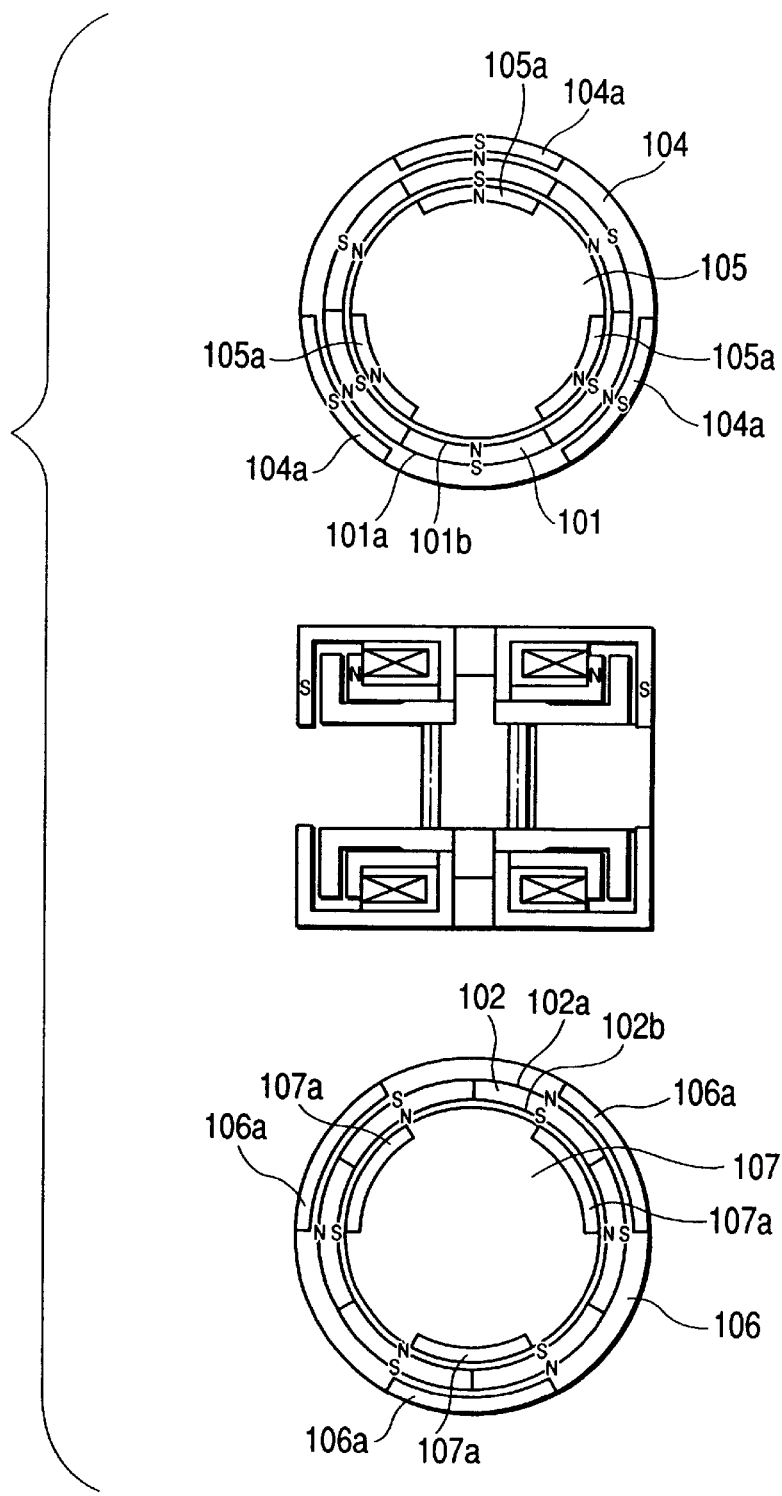
FIG. 10 is a view showing the first state for explaining the rotational operation of the motor as shown in FIG. 9.
Figure 11:
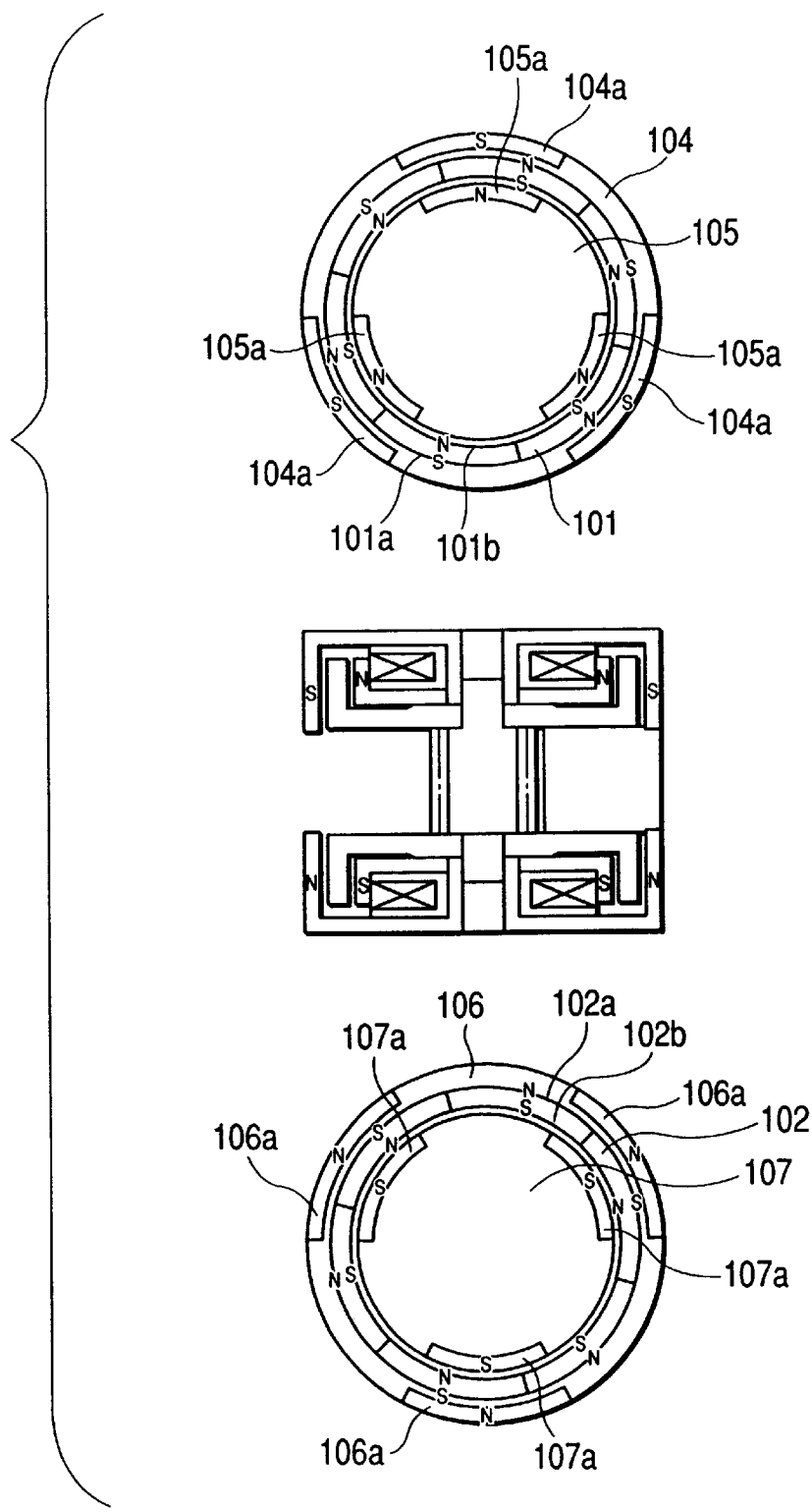
FIG. 11 is a view showing the second state for explaining the rotational operation of the motor as shown in FIG. 9.

First, the initial state is shown in FIG. 10. In this state, the first stator yoke α is excited so that the comb teeth 104a are an S-pole and the comb teeth 105a are an N-pole by energizing the coil 108, to coincide the angular center of magnetization portion in the first rotor 101 with that of the comb teeth 104a, 105a. On the other hand, since the coil 109 is not energized, the second stator yoke β is not excited, so that the angular center of magnetization for the second rotor 102 is disposed apart by 90° in electrical angle with respect to the angular center of the comb teeth 106a, 107a.

The coil 109 is energized from this state, to excite the second stator yoke β so that the comb teeth 106a are an N-pole and the comb teeth 107a are an S-pole, for example, whereby the second rotor 102 is subject to attraction and repulsion by each magnetic portion, so that the rotor itself (including the first rotor 101, the second rotor 102 and the rotational shaft 103) is rotated in the counterclockwise direction in the state of the lower figure (in the clockwise direction in the above figure). On the other hand, since the first stator yoke α continues in the excited state, the rotor (including the first rotor 101, the second rotor 102, and the rotor gear 103) is rotated by 45° in electrical angle in the clockwise direction in the state of the upper figure and stands still (state of FIG. 11).

Figure 12:
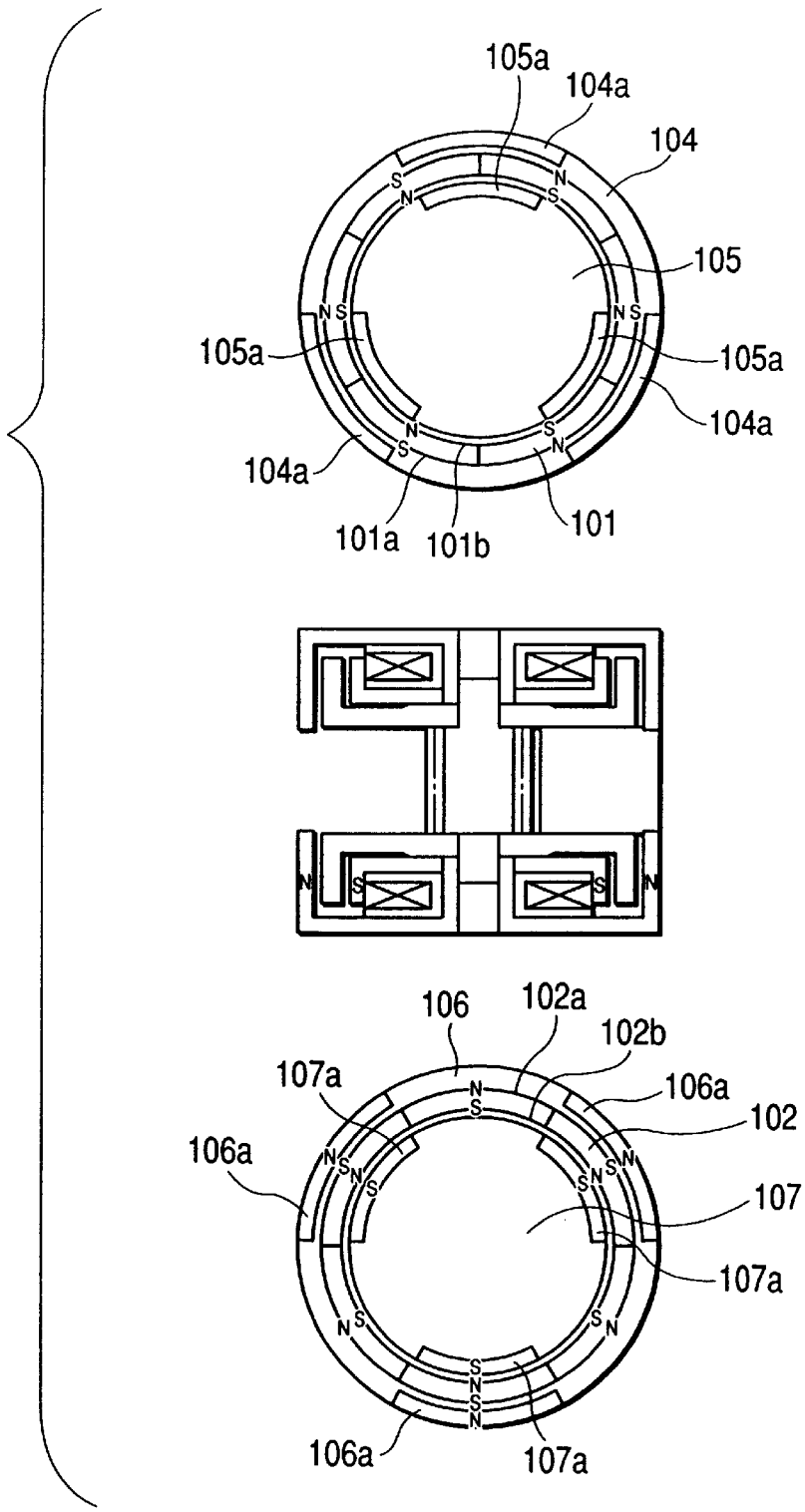
FIG. 12 is a view showing the third state for explaining the rotational operation of the motor as shown in FIG. 9.

Then, if the excitation of the first stator yoke α is released, the second rotor 102 is further rotated in the counterclockwise direction by 45° in electrical angle in the state of the under figure (or in the clockwise direction in the above figure) so as to coincide the center of magnetization angle for the second rotor 102 with the angular center of the comb teeth 104a, 105a, with the magnetic force of the second rotor 102 and the excitation of the second stator yoke β, and stands still (state of FIG. 12).

Then, the coil 108 is reenergized, but is excited so that the comb teeth 104a of the first stator yoke α is an N-pole and the comb teeth 105a an S-pole at this time. Thereby, the first rotor 101 is subject to attraction and repulsion by each magnetic pole, with the magnetic force of the first rotor 101 and the excitation of the first stator yoke α, so that the rotor itself (including the first rotor 101, the second rotor 102 and the rotational shaft 103) is further rotated in the clockwise direction in the state of the upper figure (or in the counterclockwise direction in the under figure).

Figure 13:
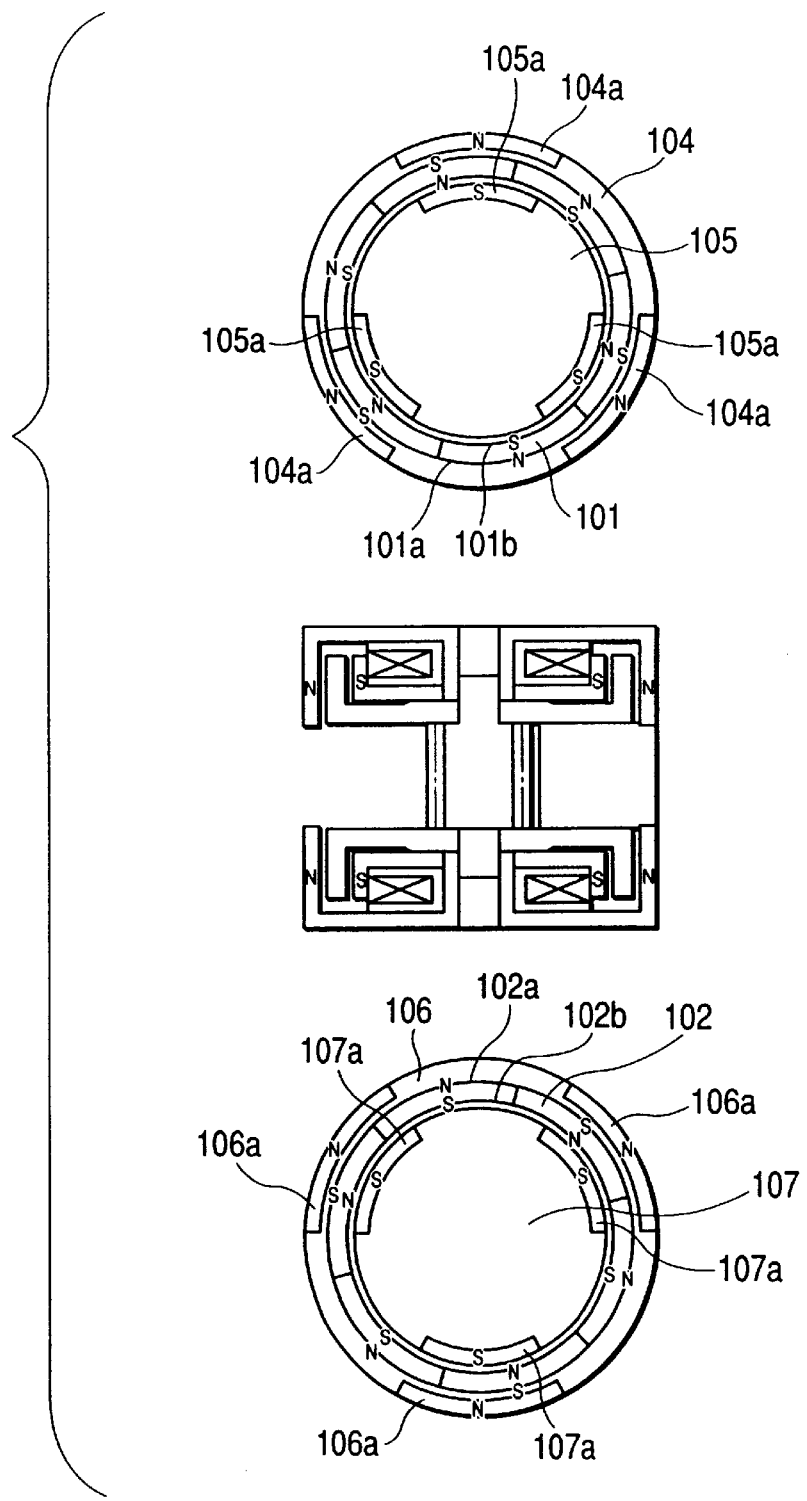
FIG. 13 is a view showing the fourth state for explaining the rotational operation of the motor as shown in FIG. 9.

On the other hand, since the second stator yoke β continues the excited state, the rotor (including the first rotor 101, the second rotor 102, and the rotor gear 103) is rotated by 45° in electrical angle in the counterclockwise direction in the state of the lower figure and stands still (state of FIG. 13).

Figure 14:
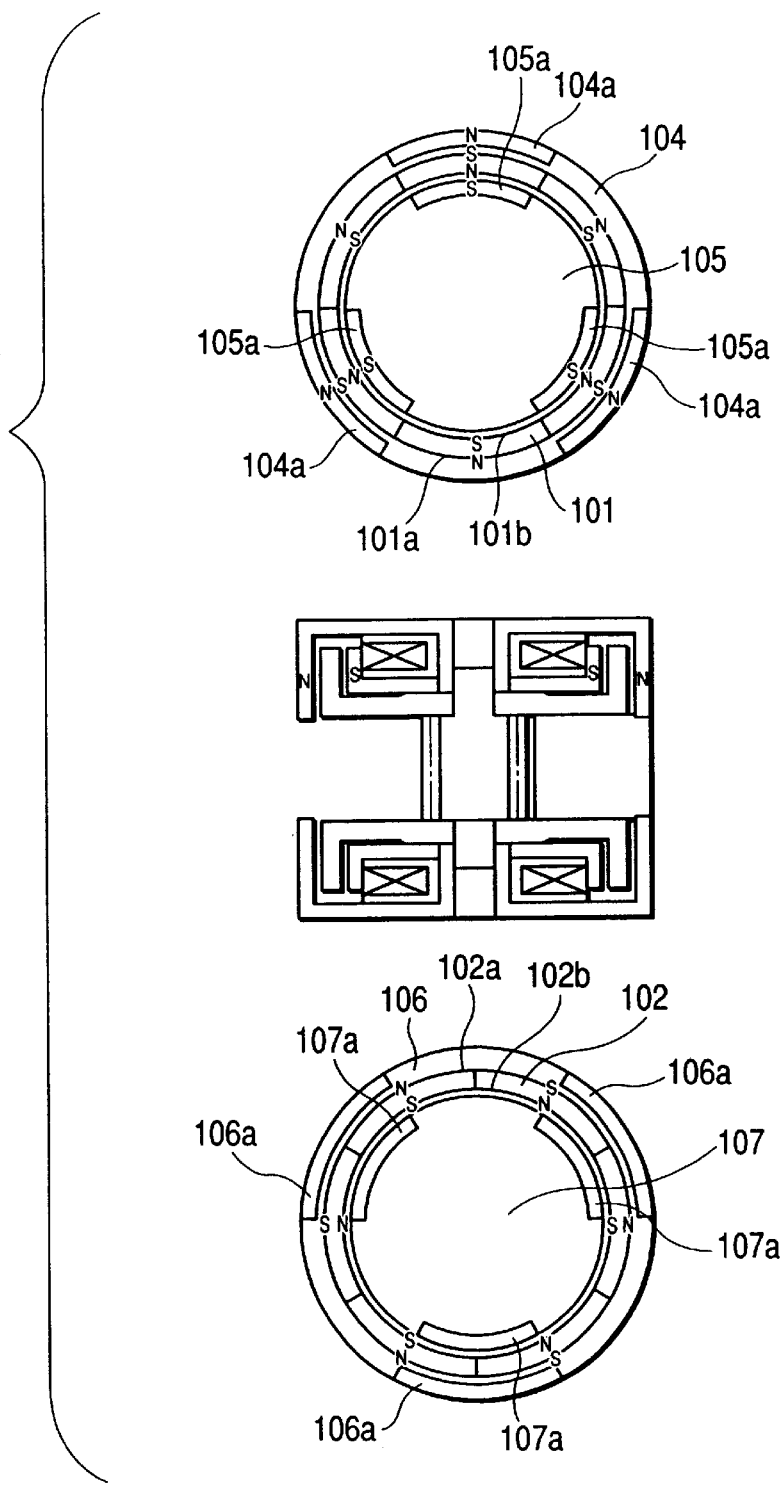
FIG. 14 is a view showing the fifth state for explaining the rotational operation of the motor as shown in FIG. 9.

Then, if the excitation of the second stator yoke β is released, the first rotor 101 is further rotated in the clockwise direction by 45° in electrical angle in the state of the above figure so as to coincide the angular center of the magnetization for the first rotor 101 with the angular center of the comb teeth 104a, 105a, with the magnetic force of the first rotor 101 and the excitation of the first stator yoke α, and stands still (state of FIG. 14). By continuing this relation, the motor can be rotated. Note that the excitation relation may be reversed in order to rotate the motor in an opposite direction to the rotational direction as previously described.

A third embodiment which embodies a motor of the invention as show in FIG. 1 will be described below with reference to FIG. 15, in which a different point from the first and second embodiments is that the shape of stator is changed.

Figure 15:
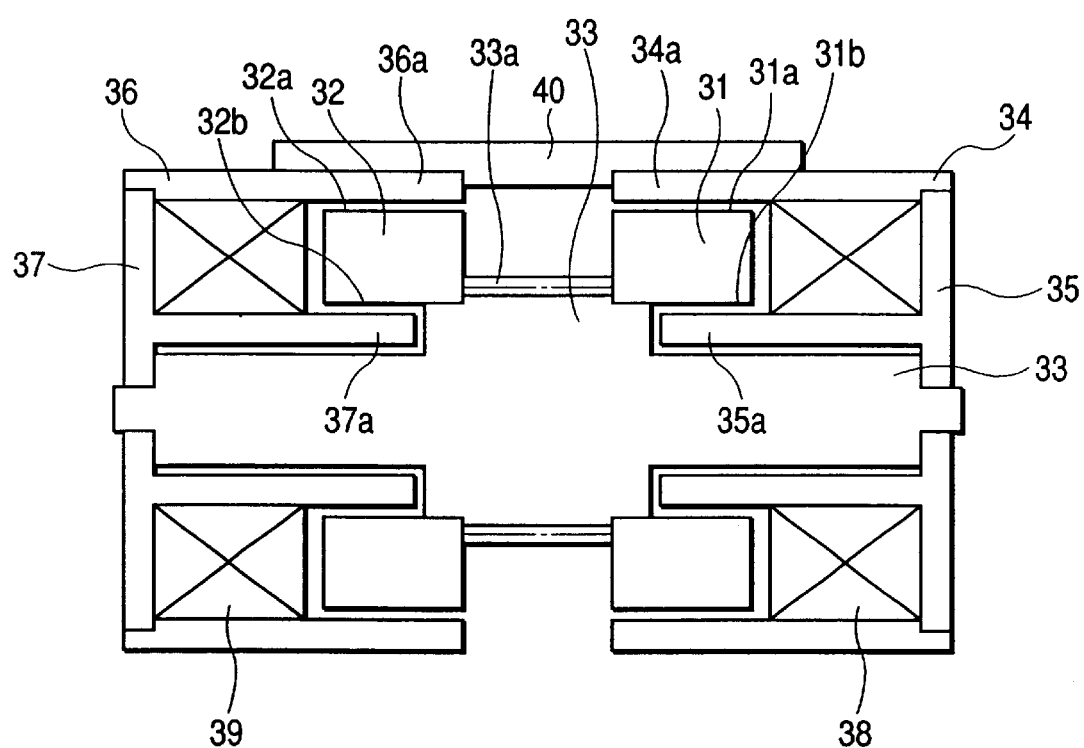
FIG. 15 is a cross-sectional view of a motor in a third embodiment in which the motor as shown in FIG. 1 is embodied.

FIG. 15 is a cross-sectional view of the motor as shown in FIG. 1 and embodied, when assembled.

In FIG. 15, 31 is a first rotor that has been magnetized to produce plural magnetic regions from an outer diameter portion 31a to an inner diameter portion 31b (or from the inner diameter portion 31b to the outer diameter portion 31a), that is, magnetized so that the outer diameter portion 31a and the inner diameter portion 31b are different poles. 32 is a second rotor that has been magnetized in the same number as the first rotor 31 from an outer diameter portion 32a to an inner diameter portion 32b (or from the inner diameter portion 32b to the outer diameter portion 32a), that is, magnetized so that the outer diameter portion 32a and the inner diameter portion 32b are different poles, like the first rotor 31.

33 is a rotational shaft having an output gear 33a for transmitting the rotational output as an electromagnetic driving motor to the outside, the first rotor 31 and the second rotor 32 being secured to the rotational shaft 33 so as to have the same phase (in magnetic pole) with respect to the rotational direction.

34 is a first stator yoke shoe formed by a soft magnetic substance and having a plurality of projection-like comb teeth 34a. 35 is another first stator yoke shoe formed by a soft magnetic substance and having a plurality of projection-like comb teeth 35a. Also, the projection-like comb teeth 35a are formed in the same number as the comb teeth 34a of the first stator yoke shoe 34 and in the same phase as the rotational direction of the first rotor 31, the comb teeth 34a, 35a being configured to be apart by 360° in electrical angle relative to the magnetization of the first rotor 31.

It is noted that the first stator yoke shoes 34, 35 are configured as a first stator yoke α so that the magnetic path can be closed when the first stator yoke shoe 34 comes into direct contact with the first stator yoke shoe 35.

36 is a second stator yoke shoe formed by a soft magnetic substance, like the first stator yoke shoe 34, having a plurality of projection-like comb teeth 36a. 37 is another second stator yoke shoe formed by a soft magnetic substance having a plurality of projection-like comb teeth 37a. Also, the projection-like comb teeth 37a are formed in the same number as the comb teeth 36a of the second stator yoke shoe 36 and in the same phase relative to the rotational direction of the second rotor 32, the comb teeth 36a, 37a being constituted to be apart by 360° in electrical angle with respect to the magnetization of the second rotor 32.

It is noted that the second stator yoke shoes 36, 37 are configured as a second stator yoke β so that the magnetic path can be closed when the second stator yoke shoe 36 comes into direct contact with the second stator yoke shoe 37, and can become another stator yoke (with respect to first stator yoke α) of a two-phase type stepping motor.

Also, the projection-like comb teeth 36a, 37a of the second stator yoke β have the phase of rotational direction disposed apart by 90° in electrical angle with respect to the projection-like comb teeth 34a, 35a of the first stator yoke α. Further, the rotational shaft 33 is rotatably fitted by the first stator yoke shoe 35 and the second stator yoke shoe 37, the output gear 33a being disposed in a gap between the first stator yoke α and the second stator yoke β to take out the output from the rotational shaft 33 (i.e., a motor which can take out the output from the center of thrust relative to the rotational axial direction).

38, 39 are coils for exciting the first stator yoke α and the second stator yoke β, respectively, and are wound concentrically with respect to the rotational direction of the first rotor 31 and the second rotor 32. 40 is a motor case for unifying the electromagnetic driving motor by positioning and supporting the first stator yoke α and the second stator yoke β with the constitution as previously described.

As above described, according to the present invention, firstly, there is provided an electromagnetic driving motor having a first stator yoke, which is excitable by energization into a first coil, a second stator yoke, which is excitable by energization into a second coil, and a rotor, which can be driven for rotation under the control of energization into the first coil and the second coil, wherein the first stator yoke and the second stator yoke are arranged in a rotational axial direction of the rotor, and the rotor is provided with a rotational output portion that allows the rotational output to be taken out from a gap between the first stator yoke and the second stator yoke, whereby a novel compact case motor, having the rotational output portion at the central part of thrust direction with respect to the rotational axial direction of the motor, can be obtained, fully coping with the mounting conditions on various products, such as small products emerging in the future.

According to the present invention, secondly, there is provided an electromagnetic driving motor, wherein a rotor is composed of a gear provided in the central part of thrust in the rotational axial direction, a first magnetizing portion facing a first stator yoke provided at the end portion of the gear, and a second magnetizing portion facing a second stator yoke provided at the opposite end portion of the gear, whereby a novel electromagnetic driving motor with a rotational output portion (gear) in the central part of thrust direction with respect to the rotational axial direction of the rotor can be obtained by a simple method that divides the rotor into three sections, fully coping with the mounting conditions on various products, such as small products emerging in the future.

According to the present invention, thirdly, since a rotor is provided with a rotational output portion (gear) in the central part of thrust in the rotational axial direction, and rotatably supported by a first stator yoke and a second stator yoke, there is the effect that there is no need for providing a new member for supporting the rotational axis of the rotor, while since the side pressure onto the rotor shaft, which is produced in rotating a working member, is received inboard, it will not occur that the rotor shaft in the cantilever form is rotated in flexing, whereby a device having mounted an electromagnetic driving motor with high performance and high quality (silentness) and without chatter rotation of the rotor can be realized.

An application example using a motor as shown in FIG. 2 for an electromagnetic driving stop device will be described below with respect to FIGS. 16 and 17.

Figure 16:
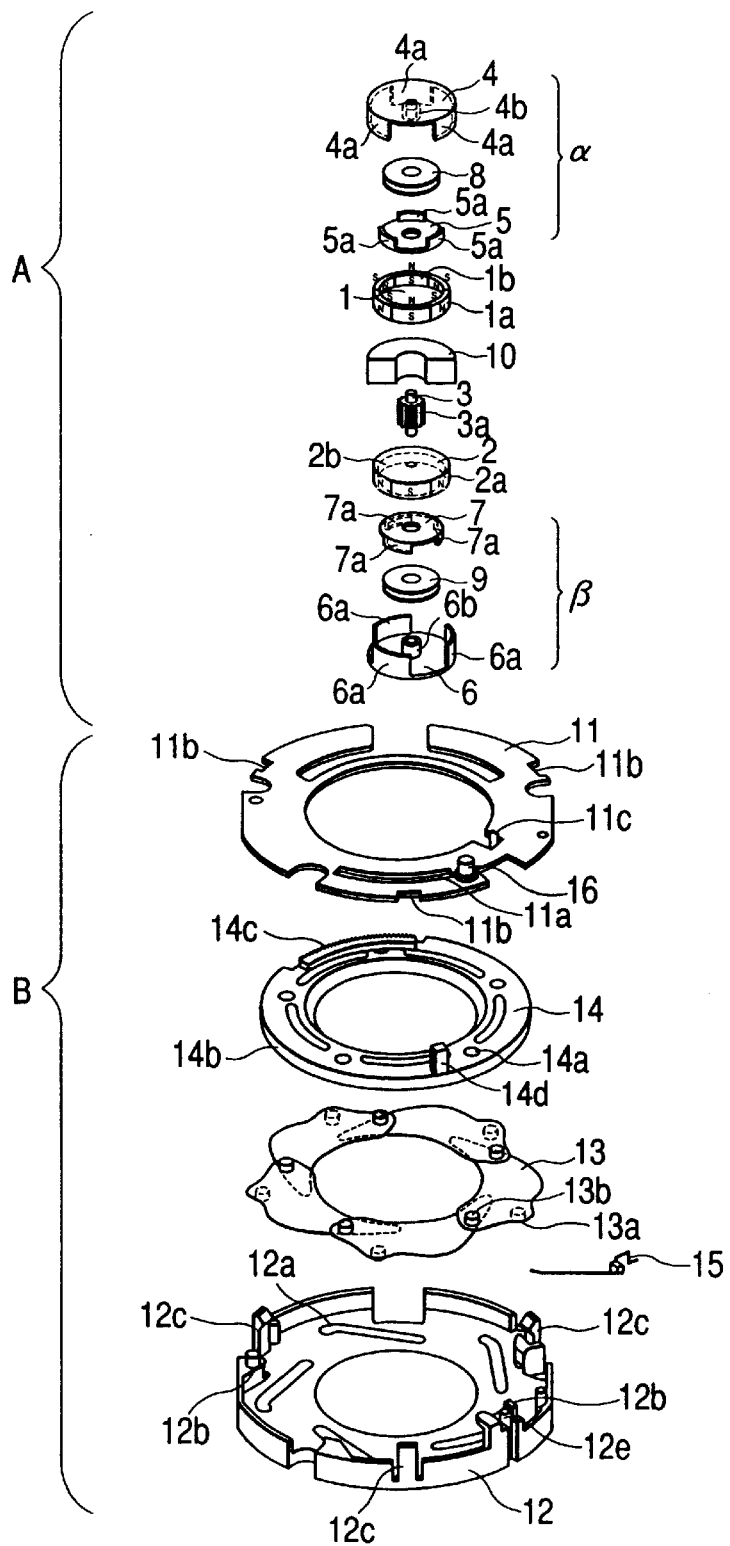
FIG. 16 is an exploded perspective view of the motor as shown in FIG. 2, when used for an electromagnetic driving stop device.

In FIG. 16, the stop device is indicated as a whole by character B and the motor A as previously described and shown in FIG. 2 is mounted on the stop device B.

11 is a conductive annular base plate having centrally an aperture through which the photographing light passes, the electromagnetic driving motor being secured to the annular base plate 11 by adhesion or the like. 12 is an annular cam plate, which is an insulating member, the cam plate 12 having a plurality of well-known aperture cams 12a cut out. 13 is a plurality of aperture blades, a dowel 13a on the back surface of each aperture blade 13 being fitted to the aperture cam 12a of the cam plate 12. 14 is a ring rotating around the optical axis, having centrally an aperture through which the photographing light passes, a surface dowel 13b of each aperture blade 13 being fitted into each of a plurality of holes 14a provided on the rotational ring 14.

An outer peripheral surface 14b of the rotational ring 14 is fitted to an inner peripheral surface of a convex portion 12b for spacing provided at three locations on the cam plate 12, the ring 14 being rotatably supported on the cam plate 12. Also, the rotational ring 14 is provided with a gear portion 14c, which is configured to mate with an output gear 3a of a rotor gear 3 within the electromagnetic driving motor A. Further, the rotational ring 14 is provided with a projection portion 14d, which is inserted into a long hole 11a provided on the annular base plate 11 to be slidable with each other.

On the other hand, the cam plate 12 is provided with three hooks 12c, in which the stop device B is constituted by having as a unit the annular base plate 11, the cam plate 12, the aperture blade 13 and the rotational ring 14 in such a way that the rotational ring 14 can be carried because the hooks engage three cut-away portions 11b on the annular base plate 11.

This stop device B has a switch for sensing whether or not the stop is open. 15 is a spring of conductive material that is a component of the switch, the spring being inserted into a switch attaching portion 12d provided integrally on the cam plate 12, one end being affixed to a projection portion 12e of the cam plate 12, and the other end being affixed to a switch pin 16. The switch pin 16 is also a conductive member, and is pressed onto the annular base plate 11 to be conductive to the annular base plate 11 at any time. That is, this switch is configured, with the annular base plate 11 itself electrically grounded, to detect whether or not there is the contact between the electrical signal spring 15 and the switch pin 16 by the engagement of a bent portion 11c with the spring 15. This switch is turned off by disconnecting the contact between the spring 15 and the switch pin 16, when the stop is opened at the projection portion 14d of the rotational ring 14. The above is a constitution of the stop device B.

With the above constitution, the operation will be described below. If the motor A is rotated, its output is transmitted to the gear portion 14c of the rotational ring 14 by the output gear 3a of the rotational shaft 3, to turn the rotational ring 14 by a predetermined angle. By this rotation of the rotational ring 14, the surface dowel 13b of the aperture blade 13 is moved in the rotational direction. And the back dowel 13a of the aperture blade 13 swings the aperture blade 13 in a direction of opening or closing, depending on the interrelation with the aperture cam 12a provided on the cam plate 12, to allow the well-known aperture opening or closing operation for the exposure adjustment.

An arrangement (layout) relation between the motor A and the stop device B will be described below with reference to FIG. 17. FIG. 17 is a cross-sectional view of the electromagnetic driving stop device mounted with the electromagnetic driving motor A. Since the first stator yoke α is contained within a thrust base of the annular base plate 11, the second stator yoke β is contained within a thrust space of the cam plate 12, and the output gear 3a of the rotor gear 3 is provided between the first stator yoke α and the second stator yoke β (in the center of thrust in the rotational axial direction of the rotor) to be able to mate with the gear portion 14c of the rotational ring 14 sandwiched between the annular base plate 11 and the cam plate 12, as seen from FIG. 17, the electromagnetic driving stop device mounted with the motor of very good matching can be provided, in which the motor A is stored without substantially protruding from the stop device B.

When the motor A is mounted on the stop device B, the motor A itself is slid in a direction orthogonal to the rotational axial direction of the rotational ring 14 within the stop device B to mate the output gear 3a within the motor A with the gear portion 14c of the rotational ring 14.

Figure 17:
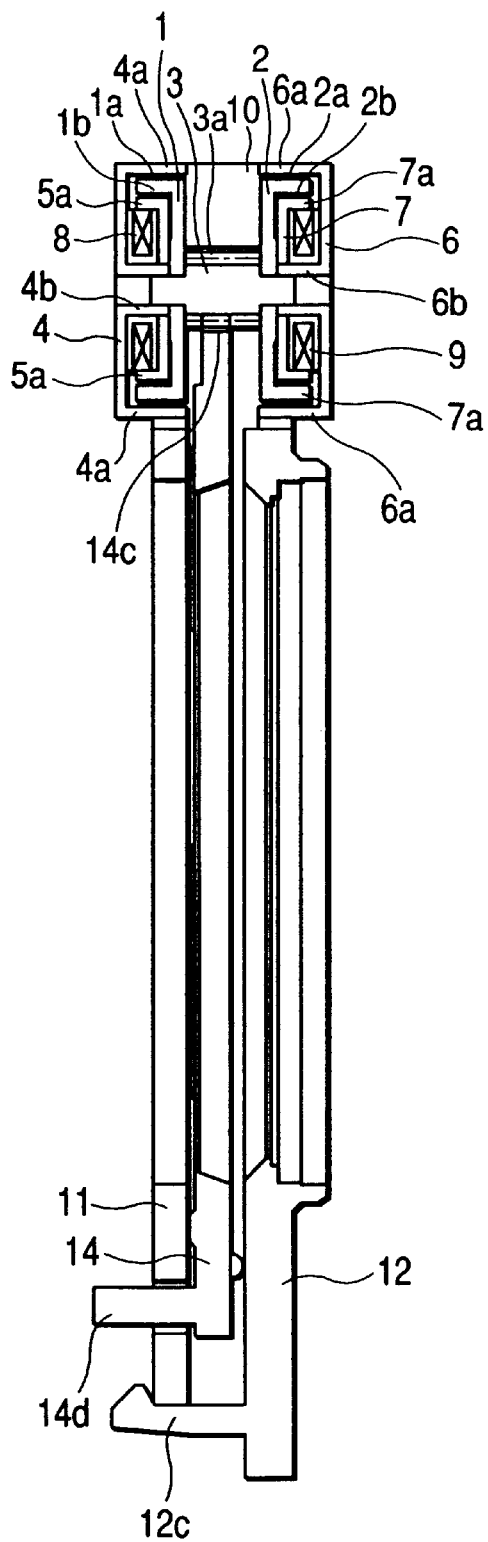
FIG. 17 is a cross-sectional view of the electromagnetic driving stop device as shown in FIG. 16, when assembled.

While the motor of the first embodiment as shown in FIG. 2 was used for the electromagnetic driving stop device as shown in FIGS. 16 and 17, it is of course possible that the motor of the second embodiment as shown in FIG. 9 or the motor of the third embodiment as shown in FIG. 15 may be used.

As above described, according to the present invention, firstly, there is provided an electromagnetic driving motor comprising a first securing member, a second securing member, a working member movable between the first securing member and the second securing member, a first stator yoke which is excitable by energization into a first coil, a second stator yoke which is excitable by energization into a second coil, and a rotor which can be driven for rotation under the control of energization into the first coil and the second coil, wherein while the rotational axial direction of the rotor is arranged in a direction substantially orthogonal to the movement direction of the working member, the first stator yoke is disposed within a space on the side of the first securing member, and the second stator yoke is disposed within a space on the side of the second securing member, whereby the electromagnetic driving motor can be mounted within an electromagnetic driving device without a bulge, fully coping with the mounting conditions on various products such as small products in the future.

According to the present invention, secondly, the first stator yoke and the second stator yoke are arranged in the rotational axial direction of the rotor, and the rotor is provided with a rotational output portion which can take out the rotational output with a gap between the first stator yoke and the second stator yoke in the central part of thrust in the rotational axial direction, whereby the novel motor having the rotational output portion in the central part of thrust in the rotational axial direction of the motor, as well as the electromagnetic driving device without bulge of the motor, can be provided, fully coping with the mounting conditions on various products such as small products in the future.

According to the present invention, thirdly, the rotor, the first stator and the second stator are unified to allow for performance check singly as the electromagnetic driving motor, whereby the electromagnetic driving device that is easy to handle such as mounting onto the device can be provided.

According to the present invention, there is provided an electromagnetic driving stop device comprising a first securing member having an aperture on the inner periphery thereof through which the photographing light passes, a plurality of aperture blades for adjusting the amount of light in the photographing light, a working member for driving the plurality of aperture blades, a second securing member having an aperture on the inner periphery thereof through which the photographing light passes and carrying the working member and the aperture blades between the first securing member and it, a first stator yoke which is excitable by energization into a first coil, a second stator yoke which is excitable by energization into a second coil, and a rotor that can be driven for rotation under the control of energization into the first coil and the second coil, wherein the first stator yoke is disposed in a space on the side of the first securing member, and the second stator yoke is disposed in a space on the side of the second stator yoke, while the rotational axial direction of the rotor is arranged in a direction substantially orthogonal to the movement direction of the working member, and the rotor is provided with a rotational output portion which can take out the rotational output with a gap between the first stator yoke and the second stator yoke in the central part of thrust in the rotational axial direction, whereby an electromagnetic driving motor can be mounted without a bulge within the electromagnetic driving stop device by driving the working member with the rotational output portion. The electromagnetic device that can fully cope with the mounting conditions on various products such as the small products developed in the future can be obtained, while since the side pressure onto the rotor shaft in driving the load is received inboard, the rotor shaft in cantilever form is not rotated in flexing, whereby an electromagnetic driving stop device having mounted the electromagnetic driving motor of high performance and high quality (silentness) without chatter rotation of the rotor can be realized.

According to the present invention, fifthly, there is provided an electromagnetic driving motor comprising as a unit the rotor, the first stator and the second stator, wherein a working member to which the rotation of the rotor is transmitted is provided with a rotated output portion for receiving the rotation of the rotor, the engagement between the rotated output portion of the working member and the rotation output portion of the rotor being effected by sliding the electromagnetic driving motor in a direction orthogonal to the driving direction of the working member, whereby the electromagnetic driving motor can be mounted within the electromagnetic driving stop device, without a bulge, by docking the stop device and the motor together with a simple constitution, fully copying with the mounting conditions on various products such as the small products developed.

What is claimed is:

1. A motor comprising:
    a first permanent magnet formed cylindrically;
    a second permanent magnet of cylindrical shape provided opposed to said first permanent magnet;
    a first coil provided coaxially with said first permanent magnet;
    a second coil provided coaxially with said second permanent magnet;
    a first stator yoke which is excited by said first coil, said first stator yoke being opposite the peripheral surface of said first permanent magnet;
    a second stator yoke which is excited by said second coil, said second stator yoke being opposite the peripheral surface of said second permanent magnet;
    a rotational shaft connecting said first permanent magnet and said second permanent magnet, said rotational shaft having its diameter smaller than that of said first permanent magnet and said second permanent magnet, the rotational output of said rotational shaft being taken out from an opposed gap between said first permanent magnet and said second permanent magnet, and
    a support member for positioning said first stator yoke and said second stator yoke, wherein said support member is provided in the opposed gap between said first permanent magnet and said second permanent magnet.

2. A motor according to claim 1, wherein
    said rotational shaft is provided with a gear for taking out its rotational output from said opposed gap between said first permanent magnet and said second permanent magnet to the outside.

3. A motor according to claim 2, wherein the rotational output of said gear formed at said rotational shaft is used for stop driving of an electromagnetic driving stop device.

4. A motor according to claim 2, wherein the rotational output of said gear formed at said rotational shaft is used for stop driving of an electromagnetic driving stop device.

5. A motor comprising:
    a first permanent magnet formed cylindrically,
    a second permanent magnet of cylindrical shape provided opposed to said first permanent magnet,
    a first coil provided coaxially with said first permanent magnet,
    a second coil provided coaxially with said second permanent magnet,
    a first outer magnetic pole which is excited by said first coil, said first outer magnetic pole being opposed to the outer peripheral surface of said first permanent magnet,
    a first inner magnetic pole which is excited by said first coil, said first inner magnetic pole being opposed to the inner peripheral surface of said first permanent magnet, a second outer magnetic pole which is excited by said second coil, said second outer magnetic pole being opposed to the outer peripheral surface of said second permanent magnet, a second inner magnetic pole which is excited by said second coil, said second inner magnetic pole being opposed to the inner peripheral surface of said second permanent magnet, and a rotational shaft connecting said first permanent magnet and said second permanent magnet, said rotational shaft having its diameter smaller than that of said first permanent magnet and said second permanent magnet, and formed with a gear for taking out its rotational output from an opposed gap between said first permanent magnet and said second permanent magnet to the outside.

6. A motor according to claim 5, further comprising a support member for positioning said first stator yoke and said second stator yoke, wherein said support member is provided in the opposed gap between said first permanent magnet and said second permanent magnet.

7. A motor comprising:

a first permanent magnet of cylindrical shape having an opening face and provided with a storing space inside, a second permanent magnet of cylindrical shape having an opening face and provided with a storing space inside, said second permanent magnet being opposed to said first permanent magnet, with each opening face directed outward, a first coil provided in the storing space within said first permanent magnet, a second coil provided in the storing space within said second permanent magnet, a first outer magnetic pole which is excited by said first coil, said first outer magnetic pole being opposed to the outer peripheral surface of said first permanent magnet, a first inner magnetic pole which is excited by said first coil, said first inner magnetic pole being opposed to the inner peripheral surface of said first permanent magnet, a second outer magnetic pole which is excited by said second coil, said second outer magnetic pole being opposed to the outer peripheral surface of said second permanent magnet, a second inner magnetic pole which is excited by said second coil, said second inner magnetic pole being opposed to the inner peripheral surface of said second permanent magnet, and a rotational shaft connecting said first permanent magnet and said second permanent magnet, said rotational shaft taking out its rotational output from an opposed gap between said first permanent magnet and said second permanent magnet.

8. A motor according to claim 7, wherein said first permanent magnet and said second permanent magnet have at least the outer peripheral surfaces divided into n in the peripheral direction, and are alternately magnetized into different poles.

9. A motor according to claim 8, wherein said first permanent magnet and said second permanent magnet have at least the inner peripheral surfaces divided into n in the peripheral direction, and are alternately magnetized into different poles, and alternately magnetized into different poles from the adjacent outer peripheral surfaces.

10. A motor according to claim 7, wherein said first outer magnetic pole and said first inner magnetic pole form the first stator yoke, and said second outer magnetic pole and said second inner magnetic pole form the second stator yoke.

11. A motor according to claim 7, wherein said rotational shaft is formed with a gear for taking out its rotational output from the opposed gap between said first permanent magnet and said second permanent magnet to the outside.

12. A motor according to claim 11, wherein said third yoke and said fourth yoke are connected by a connecting member of cylindrical shape.

13. A motor comprising:

a first rotor formed cylindrically and composed of a permanent magnet;

a second rotor of cylindrical shape provided opposed to said first rotor;

a first coil provided coaxially with said first rotor;

a second coil provided coaxially with said second rotor;

a first stator yoke which is excited by said first coil, said first stator yoke being opposite the peripheral surface of said first rotor;

a second stator yoke which is excited by said second coil, said second stator yoke being opposite the peripheral surface of said second rotor; and a rotational shaft connecting said first rotor and said second rotor and supported for rotation by said first stator yoke and said second stator yoke, said rotational shaft having its diameter smaller than that of said first rotor and said second rotor, the rotational output of said rotational shaft being taken out from an opposed gap between said first rotor and said second rotor, wherein said rotational shaft is formed with a gear for taking out its rotational output in the central part of thrust in the rotational axial direction.

14. A motor according to claim 13, further comprising a support member for positioning said first stator yoke and said second stator yoke, wherein said support member is provided in the opposed gap between said first permanent magnet and said second permanent magnet.

* * * * *

UNITED STATES PATENT AND TRADEMARK OFFICE
CERTIFICATE OF CORRECTION

PATENT NO. : 6,222,287 B1
DATED : April 24, 2001
INVENTOR(S) : Ryuji Suzuki

It is certified that error appears in the above-identified patent and that said Letters Patent is hereby corrected as shown below:

Column 1,
Line 42, "producing," should read -- producing --.

Column 3,
Line 57, "by" should read -- by a --.

Column 5,
Line 16, "above" should read -- upper --.
Line 36, "110a)," should read -- 101a), --.

Column 7,
Line 8, "under" should read -- lower --.
Line 23, "under" should read -- lower --.
Line 42, "show" should read -- shown --.

Column 12,
Line 56, "magnet," should read -- magnet; --.
Line 58, "magnet," should read -- magnet; --.
Line 60, "magnet," should read -- magnet; --.
Line 63, "magnet," should read -- magnet; --.
Line 66, "magnet," should read -- magnet; --.

Column 13,
Line 4, "magnet," should read -- magnet; --.
Line 8, "magnet," should read -- magnet; --.
Line 17, "comprising" should read -- comprising: --.
Line 24, "inside" should read -- inside; --.
Line 29, "outward," should read -- outward; --.
Line 31, "magnet," should read -- magnet; --.
Line 33, "magnet," should read -- magnet; --.
Line 36, "magnet," should read -- magnet; --.
Line 39, "magnet," should read -- magnet; --.
Line 42, "magnet," should read -- magnet; --.
Line 46, "magnet," should read -- magnet; and --.

UNITED STATES PATENT AND TRADEMARK OFFICE
CERTIFICATE OF CORRECTION

PATENT NO.   : 6,222,287 B1
DATED        : April 24, 2001
INVENTOR(S)  : Ryuji Suzuki It is certified that error appears in the above-identified patent and that said Letters Patent is hereby corrected as shown below:

<u>Column 14,</u>
Line 48, "comprising" should read -- comprising: --.

Signed and Sealed this

Seventeenth Day of September, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO. : 6,222,287 B1
DATED : April 24, 2001
INVENTOR(S) : Ryuji Suzuki

It is certified that error appears in the above-identified patent and that said Letters Patent is hereby corrected as shown below:

Column 1,
Line 42, "producing," should read -- producing --.

Column 3,
Line 57, "by" should read -- by a --.

Column 5,
Line 16, "above" should read -- upper --.
Line 36, "110a)," should read -- 101a), --.

Column 7,
Line 8, "under" should read -- lower --.
Line 23, "under" should read -- lower --.
Line 42, "show" should read -- shown --.

Column 12,
Line 56, "magnet," should read -- magnet; --.
Line 58, "magnet," should read -- magnet; --.
Line 60, "magnet," should read -- magnet; --.
Line 63, "magnet," should read -- magnet; --.
Line 66, "magnet," should read -- magnet; --.

Column 13,
Line 4, "magnet," should read -- magnet; --.
Line 8, "magnet," should read -- magnet; --.
Line 17, "comprising" should read -- comprising: --.
Line 24, "inside" should read -- inside; --.
Line 29, "outward," should read -- outward; --.
Line 31, "magnet," should read -- magnet; --.
Line 33, "magnet," should read -- magnet; --.
Line 36, "magnet," should read -- magnet; --.
Line 39, "magnet," should read -- magnet; --.
Line 42, "magnet," should read -- magnet; --.
Line 46, "magnet," should read -- magnet; and --.

UNITED STATES PATENT AND TRADEMARK OFFICE
CERTIFICATE OF CORRECTION

PATENT NO.    : 6,222,287 B1
DATED         : April 24, 2001
INVENTOR(S)   : Ryuji Suzuki It is certified that error appears in the above-identified patent and that said Letters Patent is hereby corrected as shown below:

<u>Column 14,</u>
Line 48, "comprising" should read -- comprising: --.

Signed and Sealed this

Eighth Day of October, 2002

*Attest:*

*Attesting Officer*

JAMES E. ROGAN
*Director of the United States Patent and Trademark Office*